INVENTORS:
MICHAEL N. PAPADOPOULOS
CARL H. DEAL
BY: Jack L. Foltz
THEIR ATTORNEY

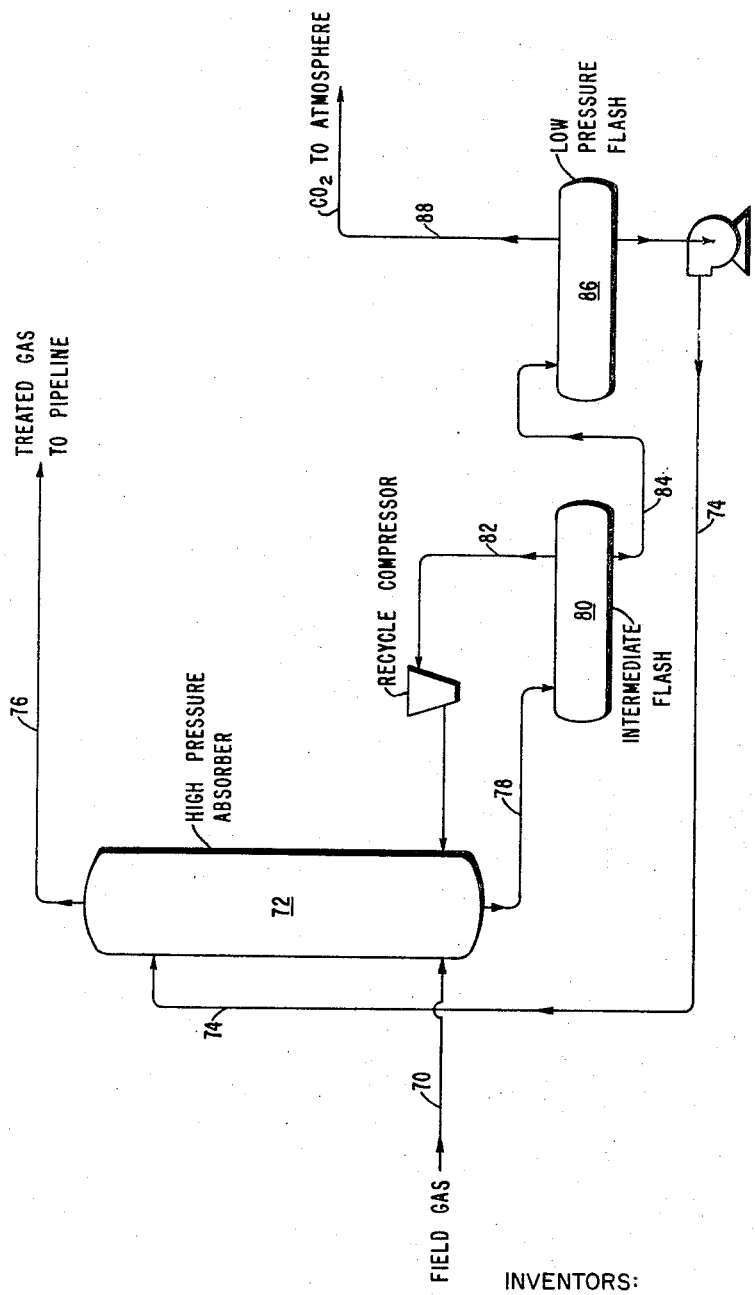

United States Patent Office 3,347,621
Patented Oct. 17, 1967

3,347,621
METHOD OF SEPARATING ACIDIC GASES FROM GASEOUS MIXTURES
Michael N. Papadopoulos, Metairie, La., and Carl H. Deal, Orinda, Calif., assignors to Shell Oil Company, New York, N.Y., a corporation of Delaware
Filed Nov. 2, 1964, Ser. No. 410,819
14 Claims. (Cl. 23—2)

ABSTRACT OF THE DISCLOSURE

Method of removing acidic gases from gaseous mixtures comprising contacting the gaseous mixture with a liquid absorbent comprising diisopropanolamine and a cyclotetramethylene sulfone. The liquid absorbent may comprise 15–45% by weight of diisopropanolamine and 55–85% by weight of the sulfone or 1–25% by weight of water, 15–45% by weight of diisopropanolamine and 50–84% by weight of the sulfone.

---

Figure 1:
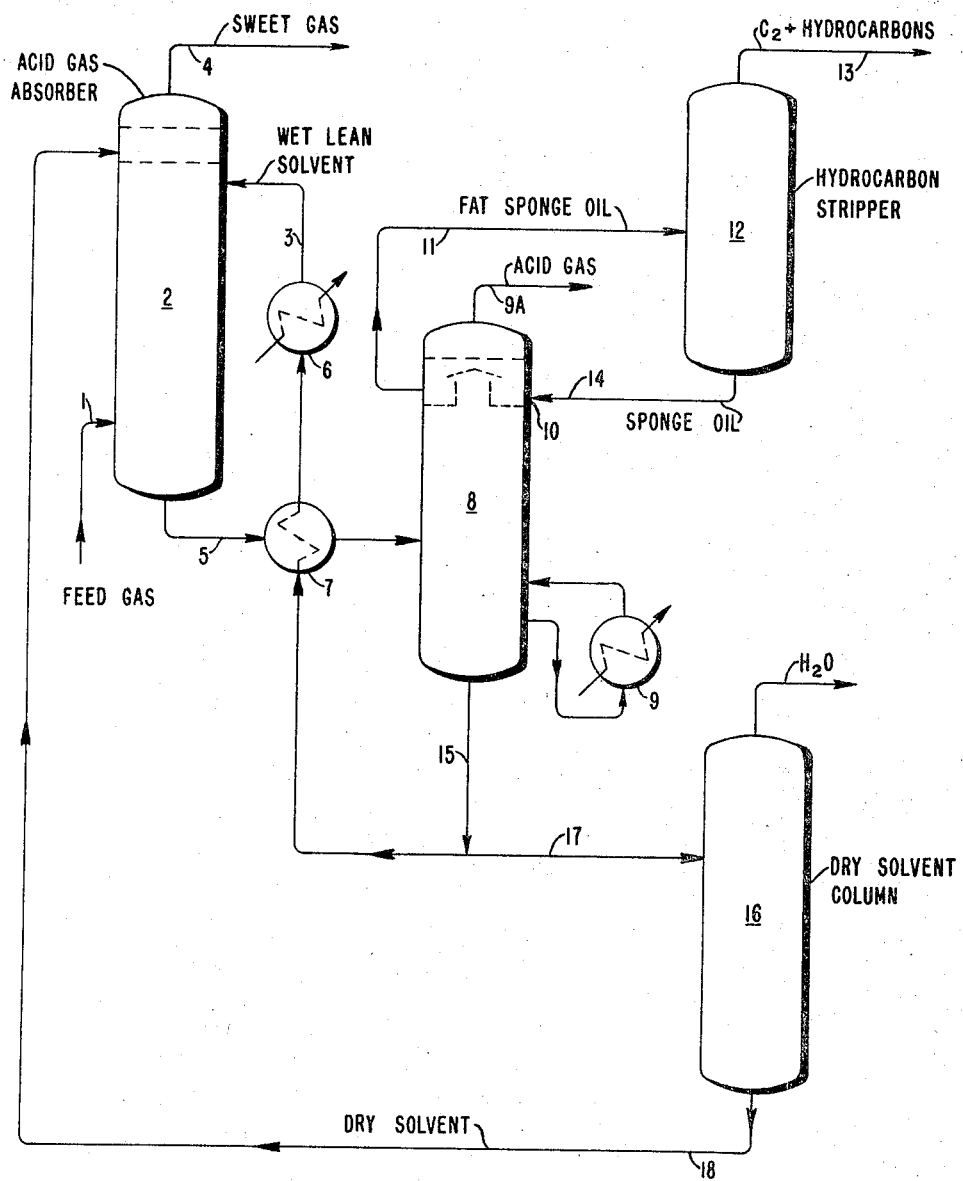

This is a continuation-in-part of applicants' copending case Serial No. 250,794, filed January 11, 1963, and now abandoned, which was a continuation-in-part of applicants' Serial No. 131,385, filed August 14, 1961, now abandoned.

This invention relates to the separation of acidic gases from gaseous mixtures. More particularly, this invention relates to the separation of acidic gases from gas mixtures by means of a selective absorbent.

A number of methods have previously been proposed for the purification of mixtures of hydrocarbon gases contaminated with such materials as hydrogen sulfide, carbonyl sulfide, carbon dioxide and the like. Some of these methods involve the formation of alkanolamine salts of the acid gases, the salts being subsequently decomposed, usually by heating, to regenerate the solution utilized as an absorbent and to drive off the gas absorbed.

In many cases aqueous solutions of alkanolamines and the like are utilized. Such solutions have relatively limited solubility for acid gases. This results in a necessity for recycling and treating unduly large quantities of such solutions. It also results in spending unduly large amounts of heat to regenerate such solutions. It also may result in undue corrosion of processing equipment. One of the most important disadvantages of the use of such solutions is the limited solubility for the acid gases when the latter are under a high partial pressure. This results in only fractional removal of the acid gas from its admixture with hydrocarbons or other gaseous materials. Another serious problem is that of foaming in the process equipment. This problem is often so significant that it is usually necessary to compensate for it by employing oversize contacting equipment to accommodate the increased volume resulting from the presence of foam in the system.

Contrasted to the use of so-called "chemical solvent" (involving the formation of salts or other decomposable reaction products), certain classes of materials are regarded as "physical solvents." These include such materials as glycols which appear to act in a purely physical manner, absorbing acidic gases physically without the formation of any apparent reaction product. Mixtures of glycols with amines are known, particularly for the treatment of liquid hydrocarbon products or the removal of mercaptans, $H_2S$ and other acidic substances. However, glycols have not been found to be very efficient due to the limited solubility of acidic gases therein. Aqueous dispersions of glycols are no better in this respect and, moreover, may exhibit extreme corrosiveness toward processing equipment.

One of the problems encountered, especially in the processing of gases initially having high partial pressures of acid components, is efficient removal of the entire acid component content both at the time the gas contains relatively high partial pressure of acid gas and after removal of the major proportion, i.e., at the time when the gas contains acid gases only at a relatively low partial pressure. None of the known absorbents are efficient in both respects.

Another disadvantage of the use of aqueous solutions is the necessity for a separate dehydration step, since such absorbents do not selectively remove water at the same time they absorb acidic gases such as hydrogen sulfide. Since water cannot be tolerated in almost all instances in the sweet gas stream, its removal constitutes an additional cost factor in the processing of gases.

A number of problems have arisen in addition to those outlined above. The thermal stability of organic solvents becomes a problem especially during the stripping step wherein the fat solvent is heated to a temperature sufficient to cause a separation of the acid gases from the solvent. Under these conditions is is often found that many solvents show undue decomposition constituting a major cost factor in the operation of the process. Another major problem is the differential in temperature between that of the absorption column and in the stripping column. While a large part of this differential can be readily handled by heat exchanging the various streams involved in the process, nonetheless, it is often necessary to utilize external cooling means to cool the recycle stream of clean regenerated solvent to the absorber, as well as to employ heating means for heating the fat solvent coming from the bottom of the absorber column to the stripping column. Still another problem of major significance comprises the stripping steam requirement for many solvents which also constitutes a major cost factor.

Now, in accordance with the present invention, a process has been found for the separation and recovery of acidic gases from mixtures containing the same, wherein efficient recovery is obtained and wherein the problems stated above are overcome or minimized.

The process of the invention comprises contacting the gas mixture with a liquid absorbent comprising 15–45% by weight of diisopropanolamine, 1–25% by weight of water and essentially all of the balance being at least one cyclotetramethylene sulfone. In another aspect, the invention comprises contacting a gas mixture containing acidic gaseous components with a liquid absorbent comprising 45–65% by weight of diisopropanolamine, 15–25% by weight of water and essentially all of the balance being at least one cyclotetramethylene sulfone. In still another aspect, the invention comprises contacting a gas mixture containing acidic gaseous components with an anhydrous mixture of 15–45% by weight of diisopropanolamine and 55–85% of a cyclotetramethylene sulfone. Still in accordance with the invention, the water content of the effluent sweet gas from the absorption step is substantially reduced by coabsorption with the acid gases and it is further minimized by scrubbing with a slipstream of the same mixture of solvents minus substantially all of the specified water content originally present in the mixed absorption solvent.

The nature and advantages of the process of the invention will also become more apparent to those skilled in the art in view of various embodiments of the invention which are schematically represented in the annexed drawing comprising FIGURES I through IV.

FIGURE I discloses a typical case for the treatment of a sour natural gas containing both $H_2S$ and $CO_2$ in substantial amounts.

FIGURE II shows a preferred process variation involving maximum utility of the absorption streams and separation of aromatics from non-aromatic hydrocarbons of higher than the normally gaseous range.

FIGURE III shows a process flow scheme wherein the inventive process is utilized in combination with a conventional process for the manufacture of hydrogen.

FIGURE IV illustrates another variation of the inventive process which involves the bulk removal of $CO_2$ from natural gas.

The principal attainment of the process of this invention is the high degree of removal, at very low solvent flows and heat loads, of acidic gas components from gaseous mixtures containing progressively smaller amounts of acidic gas. For example, when a gaseous mixture enters the lower part of an absorption column countercurrent to a descending stream of liquid absorbent, the most efficient operation is obtained by use of the absorption solvent composition of this inventive process, since a high degree of absorption is obtained under the relatively high initial partial pressure of acidic gases. This high rate of absorption is maintained even as the partial pressure of acidic gas progressively decreases as the scrubbed gas mixture proceeds upward in the column.

An essential aspect of one embodiment of the above described mixed solvent comprises the presence of the highly restricted proportion of water therein as compared with mixed solvents containing no water on the one hand and other well known conventional solvents, such as diethanolamine diluted with much greater proportions of water. The mixed solvent utilized as described, has been found to possess certain technical and economic advantages not obtained by the use of aqueous alkanolamines nor by anhydrous mixed solvents.

The aqueous mixed solvent of the present invention has a number of advantages which include hydrogen sulfide solubility over a wide range of partial pressures; improved selectively for hydrogen sulfide over hydrocarbons; substantial absence of corrosion and foaming; and substantially improved stripping characteristics. In the latter respect, it has been found that in stripping fat solvent to remove $H_2S$, the solvents being the aqueous mixed solvent described above, the steam requirement per unit volume of mixed solvent is much lower than for other solvent systems. For comparison, stripping steam requirements with a typical "chemical solvent" (such as aqueous diethanolamine) is three times higher than that of the present mixed solvent, mostly because of the much lower molecular weight of the "chemical solvent." Furthermore, for most applications, the volumetric requirements for $H_2S$ absorption are much lower with the aqueous mixed solvent than with the conventionally used aqueous alkanolamines. Hence, the process heat load, an item accounting for over 50% of the process operating cost, is about one quarter or less than that of aqueous alkanolamines.

It has further been found that the advantage to be gained by employing 1–25% by weight of water, 15–45% by weight of diisopropanolamine and the remainder cyclotetramethylene sulfone for the removal of acidic gases can be further enhanced, through employment of water in the preferred range of 15–25% by weight. This enables the diisopropanolamine content to be increased to 45–65% by weight with the remainder, i.e., 20–40% by weight being a cyclotetramethylene sulfone. The benefit obtained from the use of this range of combinations of diisopropanolamine and water results from a number of desirable, physical property changes that occur which are especially effective at enhancing the process economy. For example, the increase in diisopropanolamine and the use of water in the preferred range of 15–25% by weight does not adversely effect viscosity; note Table I.

TABLE I.—EFFECT OF SOLVENT COMPOSITION ON THE VISCOSITY APPROXIMATELY 100° F.

| Solvent Composition | | Viscosity, cps. | |
| --- | --- | --- | --- |
| Percent wt. DIPA | Percent wt. $H_2O$ | Lean Solvent | $CO_2$-loaded Solvent |
| 40 | 10 | 14.2 | 45 |
| 52 | 10 | 26.0 | 122 |
| 52 | 25 | 14.2 | 45 |

Furthermore, the amount of feed gas that can be sweetened by a standard volume of solvent solution is substantially enhanced by the addition of a greater proportion of diisopropanolamine; note Table II.

TABLE II.—SOLVENT CIRCULATION ADVANTAGES AS PERCENT DIPA INCREASES ABSORBER APPROX. 150° F. WITH INLET GAS APPROX. 1000 p.s.i.a.

| Percent $H_2S$ in Feed Gas | S.C.F. of Feed Gas Sweetened per Gallon of Solvent | | | |
| --- | --- | --- | --- | --- |
| | 40% wt. DIPA | | 52% wt. DIPA | |
| | 10% wt. $H_2O$ | 25% wt. $H_2O$ | 10% wt. $H_2O$ | 25% wt. $H_2O$ |
| 5 | 125 | 122 | 158 | 154 |
| 25 | 53 | 52 | 67 | 65 |

In addition, with the increased amount of water in diisopropanolamine, the percent hydrocarbon coabsorbed by the solvent is drastically reduced; note Table III.

TABLE III.—HYDROCARBON REJECTION ADVANTAGE AS PERCENT OF WATER INCREASES

| | DIPA/$H_2O$=40/10 | | DIPA/$H_2O$=52/25 | |
| --- | --- | --- | --- | --- |
| | K | Percent H.C. Coabsorbed | K | Percent H.C. Coabsorbed |
| Methane | 41 | 1.2 | 209 | 0.24 |
| Ethane | 28 | 1.7 | 133 | 0.37 |
| Propane | 18 | 2.7 | 84 | 0.59 |
| n-Butane | 11 | 4.3 | 50 | 0.99 |
| n-Pentane | 6.7 | 7.0 | 33 | 1.55 |

The use of the preferred range of water, i.e., 15–25% by weight, along with the increase in diisopropanolamine also produces a definite increase in the heat transfer coefficient; note Table IV.

TABLE IV.—HEAT TRANSFER ADVANTAGES WITH INCREASED WATER CONTENT, DIPA/SULF 1.0 (PERSON'S PLANT) 45/40 DIPA/SULF
[Heat transfer coefficient, B.t.u./hr.-ft.²-° F.]

| Equipment | $H_2O$ percent wt. | | |
| --- | --- | --- | --- |
| | 10 | 20 | 25 |
| Lean-rich Exchanger | 70 | 102 | 119 |
| Solvent Coolers | 37 | 85 | 94 |
| Reboilers | 131 | 197 | 207 |

In accordance with one version of the invention, the acid gases may be contaminated with higher boiling hydrocarbons in the gasoline range, such as is often the case in natural gas. In such cases, the acid gases are passed through a sponge oil comprising gas oil hydrocarbons ($C_{12}$–$C_{18}$ hydrocarbons) wherein the gasoline components are absorbed in the sponge oil, the acid gases passing to a utilization destination.

Another essential aspect of the instant invention is the use of diisopropanolamine rather than other closely related amines or alkanolamines. Unexpectedly, the use of this particular alkanolamine, i.e., diisopropanolamine, gives rise to vastly superior characteristics with respect to corrosion, solvent life, foaming, and heat duty requirements, which advantages are not present nearly to the same extent when other amines are employed with the cyclotetramethylene sulfone and water absorbent combination.

The sulfones which comprise compounds utilized in the process of this invention are based upon cyclotetramethylene sulfone, the basic and preferred species being sulfolane, otherwise referred to as thiophene tetrahydro-1,1-dioxide. Generally sulfones having the general configuration:

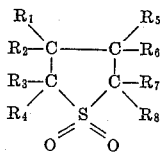

wherein at least four of the R substituents are hydrogen radicals, any remaining R's being alkyl groups having from 1 to 4 carbon atoms each are suitable for use in the instant process. Suitable modifications or derivatives include 2-sulfolene; 2-methyl tetramethylene sulfone; 3-methyl tetramethylene sulfone, 2,3-dimethyl tetramethylene sulfone; 2,4-dimethyl tetramethylene sulfone; 3,4-dimethyl cyclotetramethylene sulfone; 2,5-dimethyl cyclotetramethylene sulfone; 3-ethyl cyclotetramethylene sulfone, 2-methyl 5-propyl cyclotetramethylene sulfone as well as their analogues and homologues. It is preferred that the number of alkyl radicals not exceed 4 and still more preferably that no more than 2 alkyl substituents are appended to the tetramethylene sulfone ring.

The gas mixtures to be treated in accordance with this invention may include flue gas, synthesis gas, refinery gas or natural gas. The particular advantage of the combined absorbent utilized in accordance with this invention is the high efficiency of absorption under a wide range of partial pressures of acid gases. The latter may include hydrogen sulfide, sulfur dioxide, carbonyl sulfide, mercaptans, carbon dioxide, and the like. A typical natural gas of high acid gas content which may be treated according to the process of this invention has the following composition:

| Component: | Volume percent |
| --- | --- |
| Hydrogen sulfide | 31.48 |
| Carbon dioxide | 7.10 |
| Nitrogen | 4.52 |
| Methane | 50.35 |
| Ethane | 2.16 |
| Propane | 0.74 |
| Isobutane | 0.23 |
| Normal butane | 0.41 |
| Isopentane | 0.31 |
| Normal pentane | 0.39 |
| Hexanes | 0.53 |
| Heptanes and higher | 1.78 |

While the process of the invention may be utilized for the extraction of such highly acid gases as that exemplified above, it also may be employed for the treatment of gases wherein the acid gas content is lower such as a refinery gas having the following typical composition:

| Component: | Volume percent |
| --- | --- |
| Hydrogen sulfide | 7.5 |
| Carbon dioxide | 1.3 |
| Nitrogen | 23.0 |
| Hydrogen | 20.1 |
| Methane | 43.0 |
| Ethane | 3.3 |
| Propane | 0.8 |
| Isobutane | 0.3 |
| Normal butane | 0.2 |
| Pentanes and higher | 0.5 |

The basic step in the process of the invention comprises intimate contacting between the gaseous mixture and the liquid absorbent mixture pressures in the order of atmospheric to 1200 p.s.i., although even higher pressures may be employed. Countercurrent contacting is preferred in the absorption column, although this engineering detail may be varied according to specific plant design. A highly preferred aspect of the operation of the absorption column is to conduct absorption under rectified absorber conditions at temperatures between about 80° F. and about 275° F. (preferably 85–178° F.) and wherein the bottom of the absorption tower has a temperature between about 20 and about 150° F. higher than the temperature in the top part of the absorption zone. Normally, intimate contacting is effected in a vertically positioned tower, the sweet dry gas exiting from the tower near or at the top thereof while the fat absorbent solution (containing extracted acidic gases) leaves at or near the bottom of the tower. Heat may be supplied if necessary by means such as a steam coil or reboiler near the bottom of the tower. The latter is preferably supplied with fractionating plates, baffles or other contacting means.

The "fat" absorbent solution contains dissolved therein acid gases such as hydrogen sulfide and the like, together with possible contaminating proportions of hydrocarbons originally present in the gaseous mixture. Under the preferred rectified absorption conditions, the proportion of hydrocarbon contaminant to hydrogen sulfide is maintained at a minimum level, the maximum ratio of hydrocarbon to hydrogen sulfide or other acid gas being about 2 to 100 parts by weight. In the absence of rectification, the proportion of hydrocarbon contaminant which may occur in the fat absorbent solution is much greater, and in some cases it may well exceed the amount of hydrogen sulfide present. This is of particular disadvantage when the hydrogen sulfide is to be utilized subsequently for the preparation of elemental sulfur or for other known utilization purposes.

In the case where superatmospheric pressures are employed in the contacting zone, the fat absorbent solution is conducted from the bottom portion of the absorption tower, leaving under high pipeline pressure, preferably to a flashing zone wherein pressure is reduced to 2–100 p.s.i.g. for the purpose of removing a major portion of the acid gas and substantially all of any saturated hydrocarbons. In the same or a subsequent tower, referred to as a gas stripper, the remaining solution is reduced somewhat in pressure and heated to a temperature sufficient to volatilize the remaining acid gases and water therefrom, both of which exit at various ports near the top of the stripping tower. Alternatively the fat solvent may be sent directly to the gas stripper column from the absorption column.

One of the chief advantages of the aqueous mixed solvent of one embodiment of the present invention is experienced during the stripping operation. The presence of the highly restricted proportion of water (1–25%) has been found to enable the use of substantially lower stripping temperatures than are required when no water is utilized. Thus, it is possible to employ stripping temperatures between about 235 and 375° F. at pressures between about 0 and about 30 p.s.ig. when the restricted proportion of water is present as compared with temperatures in the order of several hundred degrees Fahrenheit higher for corresponding anhydrous solvent systems. It is immediately apparent that the use of these lower temperatures has several distinct advantages: first, the thermal degradation of the organic solvent fractions of the mixed solvent is greatly minimized; secondly, the differential in temperature between the absorption column and the stripping column is likewise held to a minimum thus, making the heating and cooling requirements far less stringent than in the anhydrous solvent system.

The proportion of water is held below the upper limit of 25% for the important reason that if greater proportions of water are employed, then the feed gas from which acid gases are being extracted is not sufficiently dehydrated for pipe line purposes. Further reference to still greater dehydration of the sweet gas obtained in the absorber column will be made hereinafter.

In accordance with one feature of the present invention, any remaining gasoline type hydrocarbons (hereinafter referred to as "heavy hydrocarbons") may be removed by contacting the acid gases with a sponge oil comprising gas oil hydrocarbons. The latter normally have from 12 to 18 carbon atoms per molecule. Under such conditions the gasoline hydrocarbons are stripped from the acid gases and the latter then exit for storage or further use, such as in a sulfur-producing plant (e.g., a Claus sulfur plant). In the latter operation, essentially pure hydrogen sulfide is oxidized to an extent sufficient to form sulfur dioxide in proportions necessary to react with hydrogen sulfide and produce elementary sulfur and water. Such combinations may be effected in the presence of catalysts according to known procedures.

Contacting of the acid gases with the sponge oil may be effected in a top section of the flasher or stripping tower or in separate scrubber towers following either the flasher or stripper, preferably at a temperature of 80–150° F.

The fat sponge oil, containing extracted gasoline hydrocarbons is warmed, such as by indirect heat exchange with lean sponge oil being recycled to the sponge oil scrubbing tower. In the sponge oil stripping section the fat sponge oil may be heated still further, such as by means of a steam coil at the bottom of the stripper, to a temperature in order of 300–400° F. for the purpose of evolving gasoline hydrocarbons. The pressure is such that at this bottom tower temperature the gasoline hydrocarbons are readily volatilized, pressures of about 25 p.s.i.a. or less being preferred. The volatilized gasoline hydrocarbons may be utilized as such or further purified if necessary by passing to a gasoline hydrocarbon purifier tower wherein they are volatilized and passed through a cooling zone where the gasoline hydrocarbons condense and exit from the bottom of the purifier while any residual acid gases pass to the acid gas collection line.

Referring now to FIGURE I in a specific case of treatment, a sour natural gas containing about 14% $H_2S$ and 6% $CO_2$, the remainder being light hydrocarbons and inert gases was utilized for treatment according to the process of the invention. The sour gas feed from the source 1 is injected into the lower section of the rectified absorber 2, fitted with a reboiler not shown and fractionation plates not shown under a pressure of about 1000 pounds p.s.i.g., the temperature of the feed being about 105° F. The bottom of the absorption tower is at a temperature of about 150° F. maintained by the reboiler, while the top section of the absorber has a temperature in the order of 95° F. to 125° F. The lean mixed solvent comprising 10% by weight of water, 30% by weight of diisopropanolamine and 60% by weight of sulfolane enters the absorber tube by means of line 3 at a temperature of about 100° F. Hydrogen sulfide and a small amount of hydrocarbons (substantially smaller proportions of hydrocarbons than with anhydrous solvent) are absorbed by the lean absorbent mixture from the sour feed. Sweet hydrocarbon gas leaves the absorption section of the absorber tower by means of line 4.

The fat absorbent, containing absorbed acid gases leaves the bottom of the absorber column 2 by means of line 5 and passes under substantially reduced pressure through heat exchanger 7 to the stripper column 8 which is heated by means of reboiler 9. Preferably the fat solvent enters the acid gas stripper at a pressure of about 10 p.s.i.g. The bottom of the stripper is at a temperature of about 260° F. Under these conditions, acid gases are stripped therefrom and pass from the acid gas stripper by means of line 9A, preferably passing through a sponge oil section 10 at the top of acid stripper tower. The fat sponge oil, containing absorbed heavy pure hydrocarbons is preferably sent by means of line 11 to a hydrocarbon stripper (flash) zone 12 to strip off absorbed hydrocarbons which pass to storage from the top of the column by means of line 13. The lean sponge oil then returns to the sponge oil section of the acid gas stripping column by means of line 14.

The regenerated mixed solvent leaves the bottom of the acid gas stripper by means of line 15 to be sent back to the top of the acid gas absorber column by means of lines 15 and 3, being utilized preferably for heat exchange purposes through heat exchangers 6 and 7.

In accordance with one preferred aspect of the present invention, a further use is made of a bleed stream of the regenerated mixed solvent. The bleed stream is sent to a dry solvent column 16 for clean up by means of line 17. The function of this dry solvent column is twofold: first, the "clean up" is highly desirable to remove extraneous impurities which naturally build up during the foregoing treating procedures; secondly, in the course of this clean up, water may be removed from the solvent mixture to produce an essentially dry mixture of diisopropanolamine and sulfolane.

The dry mixed solvent is recycled from the bottom of the dry solvent column 16 by means of line 18 to enter the top of the acid gas absorber 2. At this point it is employed for the removal of any remaining water from the sweet gas as it approaches the top of the acid gas absorber. Thus, the water content of the effluent sweet gas is reduced to permissible limits in the order of about 7 pounds per million cubic feet of sweet gas. The dry solvent then descends the column, mixing with the water-containing mixed solvent and performing its original function of absorbing hydrogen sulfide.

The bleed stream utilized for this purpose will be in the order of 1–4% based on the total wet mixed solvent being utilized throughout the system. The proportion of bleed stream is kept to a minimum so as to maintain an accurate proportion of water at the desired points particularly in the acid gas absorber and in the acid gas stripper.

Preferably, the mixed aqueous solvent is employed in amounts of 0.4–0.8 mol of aqueous mixed solvents per mol of feed gas; however, this ratio may be altered depending upon the composition of the gas to be treated. The effluent from the absorber column contains only mere traces of hydrogen sulfide, normally in the order of 1–5 p.p.m.

In order to demonstrate some of the unexpected advantages obtained by the process of the instant invention, parallel 1000-hour pilot plant tests were conducted under substantially the same operating conditions comparing the inventive process with the conventional aqueous monoethanolamine process for treating a sour natural gas of the following composition:

TABLE V.—COMPOSITION OF TEST GAS (p.=1000 p.s.i.g.)

| Component: | Mol, percent |
|---|---|
| $H_2S$ | 14.05 |
| $CO_2$ | 6.05 |
| COS | 0.01 |
| $H_2$ | 7.54 |
| $C_1$ | 58.17 |
| $C_2$ | 6.94 |
| $C_3$ | 4.14 |
| $IC_4$ | 1.02 |
| $nC_4$ | 1.51 |
| $IC_5$ | .17 |
| $nC_5$ | .13 |
| $C_6$ | .17 |
| $C_7^+$ | .11 |

The results from these tests are summarized below:

(1) The practical net solvent loadings (volumes STP acid gas/volume solvent) achieved and maintained throughout the test were at least 90% of the calculated equilibrium loadings for the inventive solvent, and were at least twice those obtained with aqueous monoethanolamine.

(2) At these loadings, the various sweet gas specifications were easily met; in particular, the stringent specifications for $H_2S$ and total sulfur (1 grain $H_2S$/100 s.c.f., 20 grains total sulfur/100 s.c.f.) were met with a safety margin of one order of magnitude.

(3) The practical feed gas throughputs in the contactor were at least twice those obtained with sq. MEA in parallel flooding tests. The capacity throughputs attained were, moreover, the same at the beginning and at the end of the 1000-hour life test. These results fully demonstrate the nonfoaming nature and stability of the solvent system.

(4) The coabsorption of hydrocarbons, although higher than that with aq. MEA, was acceptably low. The acid gas product averaged ca. 2% vol. hydrocarbons vs. slightly under 1% vol. with aq. MEA. About the same small amount of flash tank vapors (ca. 1% of the feed gas) was produced in either case. It should be noted that the feed gas chosen for this field test is usually rich in heavy hydrocarbons. With the more usually encountered drier, natural gases, or with any natural gas which has been subjected to the usually profitable oil absorption for gasoline recovery upstream of the amine unit, even lower hydrocarbon losses would be encountered.

(5) Steam consumption was about one quarter, and cooling water requirements were about one tenth of those for aq. MEA.

(6) Solvent entrainment and volatility losses to the exit gas products were a small fraction of those experienced with aqueous MEA.

(7) Solvent degradation was negligible. After the solvent system had been established in the first few hundred hours, the degradation rate fell to an undetactable level for the remainder of the test run and was probably less than 10% of inventory per year. On the other hand, although degradation products had been allowed to accumulate in the system from this and prior piloting tests, no adverse operational characteristics were even observed. In contrast the degradation of aqueous monoethanolamine was at least 200% of inventory per year.

(8) Corrosion rates on carbon steel were negligible. They were generally below 1 mpy., except in the heated fat solvent, where a maximum rate of Ca. 5 mpy. was observed. The amount of pitting on the (carbon steel) reboiling steam tubes of the regenerator was a small proportion of that experience in the aq. MEA case, and the amount of carbon steel corrosion in the various process streams was in general one order of magnitude lower than in aqueous monoethanolamine.

Figure 2:
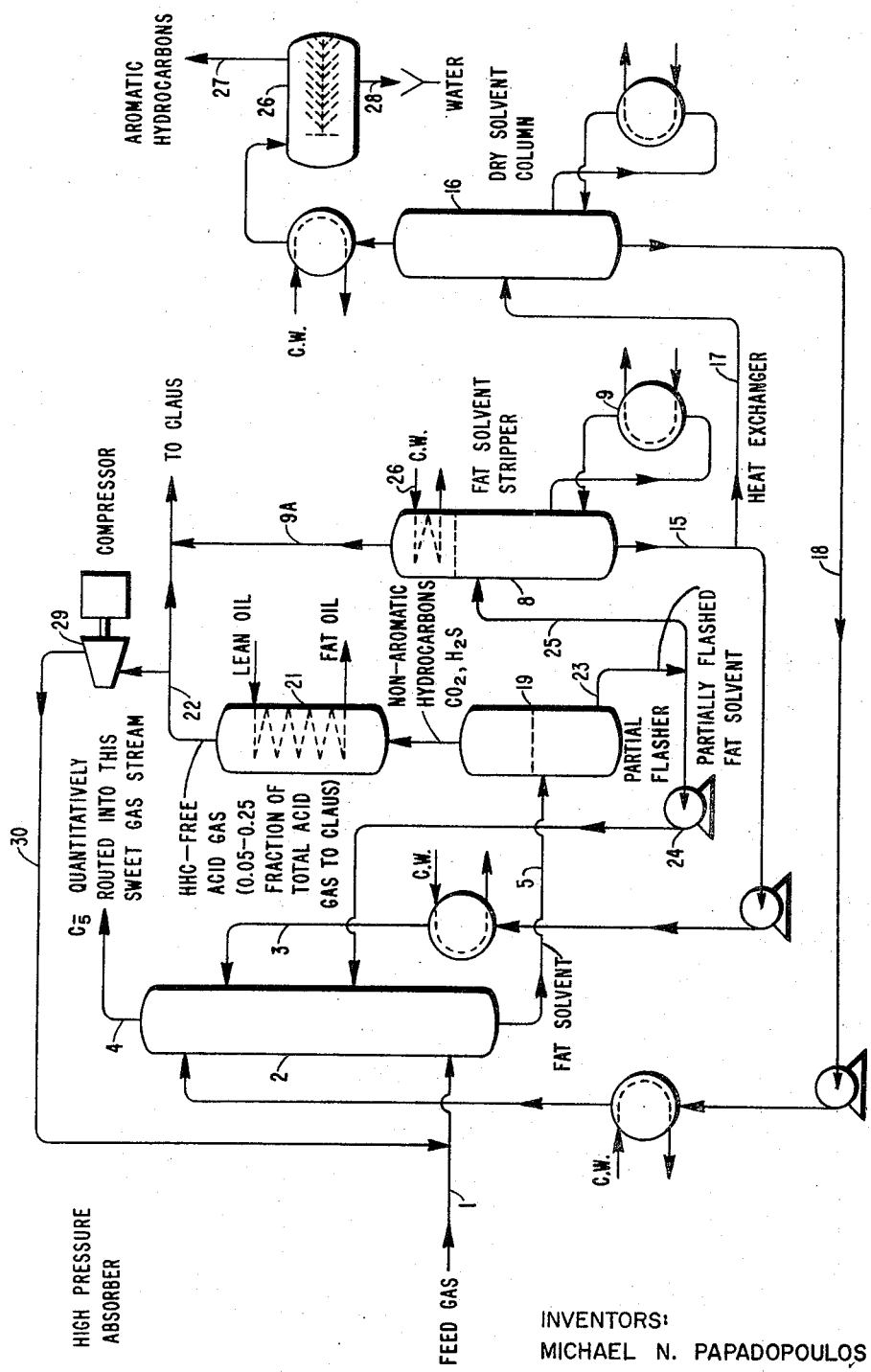
Figure 3:
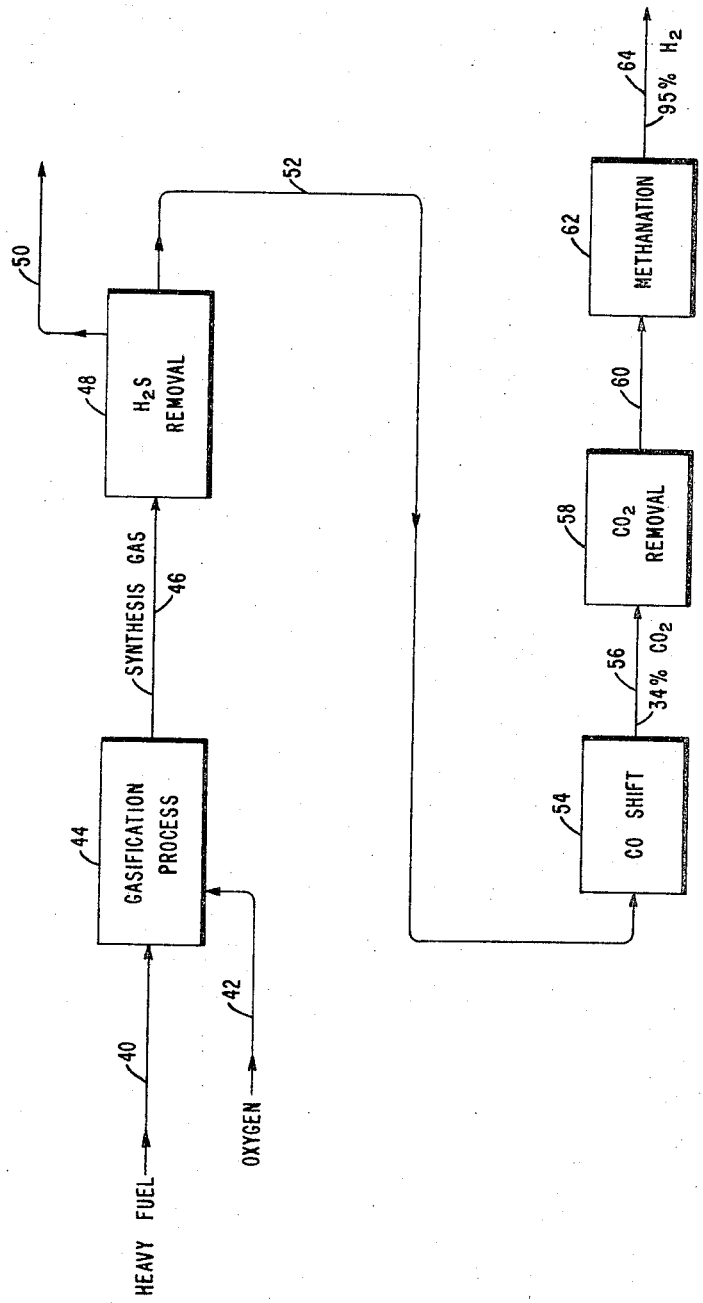

FIGURE 2 shows a preferred version of the process of this invention. Vessels having the same function as those shown in FIGURE 1 bear the same number. According to FIGURE 2, the acid-containing hydrocarbon feed gas from a source 1, enters the lower portion of the high pressure absorption column 2 and rises against a descending stream of the aqueous mixed solvent of the invention, which enters through the recycle line 3 in the upper portion of the column 2. The (saturated) fat solvent leaves by means of line 5 at the bottom of the high pressure absorber and proceeds to the partial flasher 19 wherein the pressure is sharply reduced and the temperature adjusted sufficiently to cause a rapid flashing of a major portion of the acid gases together with non-aromatic hydrocarbons, both light and/or heavy and both saturated and/or unsaturated. The acid gases and hydrocarbons then proceed to the oil scrubber 21, where sponge oil removes the hydrocarbons and the hydrocarbon-free acid gas exits from the scrubber by means of line 22. The fat sponge oil is processed as shown in FIGURE 1.

At least part of the partially flashed solvent, containing a substantially reduced acid gas content, is recycled by means of line 23 from the bottom section of partial flasher 19 and through pump 24 to the mid-section of the high pressure absorption column 2. The function of this recycle is to utilize the reserve solubility power of the partially flashed solvent to remove further quantities of acid gases from the feed contained in the absorber tower. The remaining portion of the partially flashed fat solvent proceeds by means of lines 23 and 25 to the upper portion of the fat solvent stripper 8 containing a cold upper section 26 from which the substantially pure acid gases exit by means of line 9a for further utility, such as in a Claus sulfur plant.

The stripped solvent leaves the bottom portion of the stripper 8 by means of line 15. A portion of this is recycled by means of line 3 to the upper part of the high pressure absorption tower 2 to perform its function of absorbing acid gases. A small portion (1–4% of the stripped solvent) is taken as a bleed stream 17 to the dry solvent column 16. Here, under reduced pressure, water is removed at the top of the column together with any aromatic hydrocarbons and sent to a phase separator 26. The aromatic hydrocarbon layer which separates from water is removed by line 27 to storage and water is discarded from the bottom layer by means of line 28.

In accordance with a still further preferred aspect of the invention, the acid gas leaving the oil scrubber 21 by means of line 22 may be recycled at least in part through compressor 29 and line 30 to the feed gas source 1 if it contains any residual normally gaseous hydrocarbons. Thus, these are removed by a second passage through the absorber section rather than being lost into the acid gas stream going to acid gas utilization points such as the Claus sulfur plant.

The advantage of having the oil scrubber for saturated hydrocarbons located downstream from the paritial flasher, is that the non-gaseous hydrocarbons are more conveniently removed than from an oil scrubbing section located downstream from the fat solvent stripper. This is true because the pressure is higher and the total acid gas stream is smaller.

The object of the recycle by way of the compressor 29 of the partially flashed and oil scrubbed gases is to improve the rejection of light hydrocarbons ($C_1$–$C_3$) to the sweet gas and so both avoid their waste in an acid gas utilization process and also to recover them at a high value in the sweet gas product.

The phase separator 26 yields almost pure acid gas-free aromatic hydrocarbons. This is made possible in the present process by the very high selectivity of the sulfolane portion of the mixed solvent between aromatic and non-aromatic hydrocarbons in the sense that the volatility of the aromatics is depressed by a greater order of magnitude in comparison to the volatility of the corresponding non-aromatics of comparable boiling points.

The fractional recycle of partially flashed solvents from flasher 19 to the mid-section of the high pressure absorber 2 has the objectives of first minimizing the relative amounts of solvents which are exposed to the high temperature regions of the process, so reducing the heat load of the process and reducing thermal degradation of the organic components of the solvent as well as reducing cooling water requirements. Secondly, it utilizes spare acid gas absorbing capacity of the physical solvent, in a region of the high pressure absorber where the main purpose is to remove the bulk of the acid gas and not to reduce the acid gas level to very low values.

By these alternative process schemes, it is therefore possible to partition normally liquid aromatic from non-aromatic hydrocarbons to obtain separate products. This is not possible when employing an aqueous alkanol amine as the acid gas absorbent.

The aqueous mixed solvent of the invention also makes it possible to handle feed gases containing large amounts of normally liquid hydrocarbons which is not possible with an ordinary aqueous alkanol amine absorbent. This is due to the fact that if such streams were so treated, any liquid hydrocarbons phase would separate out at the bottom of the high pressure absorber due to the very limited hydrocarbon solubility in aqueous alkanol amine. The system is very flexible in that it is possible to achieve a desired degree of rejection and/or partition of these normally liquid hydrocarbons.

The view process is particularly well suited to the purification of hydrogen gas streams generated by the partial oxidation of heavy fuel as with the Shell Gasification Process (SGP), or of similar streams produced in steam methane reforming (SMR). As in the previous case of sour natural gas treating this type of application was also piloted. The test results also show unexpected advantages over those from parallel aqueous monethanolamine tests.

One typical embodiment of the new process involves purification of a hydrogen gas stream. By reference to FIGURE III, it is seen that the instant process is effective to remove relatively low concentrations of the acid gas constituents. In this particular application, a heavy pitch derived from the $C_3/C_4$ deasphalting of refinery flasher bottoms to 60% weight overhead is fed by means of line 40 to a conventional gasification reaction zone 44 where it is contacted with oxygen entering zone 44 through line 42. Gasification conditions are maintained such that a high content hydrogen synthesis gas is produced typically containing acidic gas constituents in an amount of about 1% $H_2S$, 3% $CO_2$, and 400 p.p.m. COS at about 470 p.s.i.g. total pressure. The effluent synthesis gas is then transported by means of line 42 to an $H_2S$ removal zone 48 wherein the gaseous mixture is contacted with the mixed absorbent combination in a manner such as described previously to produce a gas stream (stream 52) which has an $H_2S$ content less than 10 p.p.m., a $CO_2$ content of not more than 20 p.p.m., and a COS content of about 4 p.p.m. The removed acidic impurities comprise substantial amounts of $H_2S$ and are passed by means of line 50 to a sulfur conversion plant. The partially purified synthesis gas is sent through line 52 to a conventional CO shift zone 54 wherein 2.5 moles of steam per mole of carbon oxide are reacted therewith under conditions such that 94% CO conversion is obtained. The product gas from the CO shift zone containing about 34% $CO_2$ at about 450 p.s.i.g. is passed through line 56 to a $CO_2$ removal zone, 58, for further contact with the mixed absorbent combination of the instant invention. Here the $CO_2$ content in the crude hydrogen gas is reduced to about 20 p.p.m. and the latter is transported through line 60 to a conventional methanation zone 62, wherefrom a stream of about 95% hydrogen gas is withdrawn by means of line 64.

While this embodiment illustrates a case where $H_2S$ and $CO_2$ removal are conducted separately, those of ordinary skill in the art will, of course, recognize that simultaneous removal of $H_2S$ and $CO_2$ is entirely practical where it is not particularly desired to produce a separate $H_2S$ stream.

Referring to FIGURE IV, there is illustrated a process using a true pressure cycle with no heat exchanger, heat, or cooling water requirements which employs the combined absorbent of the instant process. This embodiment is particularly well suited for the purification of natural gases which contain substantial amounts of $CO_2$, but contain no $H_2S$; and wherein bulk removal of the $CO_2$ is required only to meet the customary 2-3% volume $CO_2$ sales gas specification. In this flowscheme the field gas containing about 50% by volume $CO_2$ is introduced into the high pressure absorber 72 by means of line 70 where the gas is contacted with the absorbent introduced by means of line 74 into the absorber 72. The treated gas having reduced $CO_2$ content is drawn off by means of line 76 to be transported by pipeline to the ultimate user while the absorbent is regenerated by means of an intermediate (80) and low pressure (86) flashers.

We claim as our invention:

1. The process of separating acidic gases from a gaseous mixture which comprises contacting the mixture with a liquid absorbent comprising a mixture of 15-45% by weight of diisopropanolamine and 55-85% of a cyclotetramethylene sulfone.

2. The process of separating acidic gases from a gaseous mixture which comprises contacting the mixture with a liquid absorbent comprising 1-25% by weight of water, 15-45% by weight of diisopropanolamine and 50-84% by weight of a cyclotetramethylene sulfone, recovering an essentially acid-free gas, separating the extracted acid gases from the liquid absorbent containing the same and recycling the absorbent to contact additional amounts of said gaseous mixture.

3. The process of separating acidic gases from a gaseous mixture which comprises contacting the mixture with a liquid absorbent comprising 15-25% by weight of water, 45-65% by weight of diisopropanolamine and 20-40% by weight of a cyclotetramethylene sulfone, recovering an essentially acid-free gas, separating the extracted acid gases from the liquid absorbent containing the same and recycling the absorbent to contact additional amounts of said gaseous mixture.

4. The process of separating acidic gases from a gaseous mixture which comprises contacting the mixture at a temperature of at least about 80° F. and at a pressure of at least 100 p.s.i. with a liquid absorbent, said absorbent comprising 1-25% by weight of water, 15-45% by weight of diisopropanolamine and 50-84% by weight of a cyclotetramethylene sulfone, whereby an essentially acid-free gas is obtained and separated from the liquid absorbent containing extracted acid gases, and regenerating the absorbent.

5. The process of separating acidic gases from a gaseous mixture which comprises contacting the mixture at a temperature of at least about 80° F. and at a pressure of at least 100 p.s.i.g. with a liquid absorbent, said absorbent comprising 15-25% by weight of water, 45-65% by weight of diisopropanolamine and 20-40% by weight of a cyclotetramethylene sulfone, whereby an essentially acid-free gas is obtained and separated from the liquid absorbent containing extracted acid gases, and regenerating the absorbent.

6. The process of separating hydrogen sulfide from hydrocarbon gas mixtures containing the same which comprises contacting at a temperature from between 80° F. to about 275° F. and at a pressure of at least about 100 p.s.i. the gas mixture with a liquid absorbent comprising 3-8% by weight of water, 20-30% by weight of diisopropanolamine and 62-77% by weight of sulfolane, separating essentially acid-free hydrocarbon gas from absorbent containing acid gases, heating said absorbent sufficiently to separate acid gas therefrom and recycling the thus regenerated absorbent for treatment of further quantities of hydrogen sulfide-containing hydrocarbon gas mixtures.

7. The process according to claim 2 wherein the essentially acid-free gas contains a minor proportion of water and is scrubbed with a substantially anhydrous mixture of 15-45% diisopropanolamine and 59-85% cyclotetramethylene sulfone whereby substantially all of the water is extracted from the gas.

8. A process according to claim 4 wherein 1-6% by weight of the absorbent is fractionally distilled to remove substantially all of the water therefrom and recycling the substantially non-aqueous absorbent components to contact the water-containing acid-free gas, and commingling the resulting water-containing absorbent components with the main body of liquid absorbent being used in extraction of hydrogen sulfide from the acid gas-containing gas mixture.

9. A process according to claim 1 wherein the acid gas-containing solvent is subjected to a flashing operation at a substantially reduced pressure, whereby a mixture of normally liquid non-aromatic hydrocarbons and a substantial proportion of the acid gases are flashed from the solvent.

10. A process according to claim 9 wherein solvent from the flashing step is recycled to the absorption step.

11. A process according to claim 9 wherein the flashed mixture is scrubbed with a hydrocarbon oil, whereby normally liquid non-aromatic hydrocarbons are removed from the acid gases.

12. The process of claim 1 wherein the gaseous mixture is sour natural gas.

13. The process of claim 1 wherein the gaseous mixture is a hydrogen synthesis gas.

14. The process of claim 1 wherein the gaseous mixture is a refinery gas.

References Cited

UNITED STATES PATENTS

| | | | |
|---|---|---|---|
| 2,161,663 | 6/1939 | Baehr et al. | 23—3 |
| 2,797,188 | 6/1957 | Taylor et al. | 23—3 |
| 3,039,251 | 6/1962 | Kamlet | 23—2 X |
| 3,098,705 | 7/1963 | Bally | 23—3 |
| 3,161,461 | 12/1964 | Deal et al. | 23—3 |

EARL C. THOMAS, *Primary Examiner.*